United States Patent [19]
Kline et al.

[11] Patent Number: 5,182,990
[45] Date of Patent: Feb. 2, 1993

[54] METHOD OF REDUCING PRINTING ARTIFACTS

[75] Inventors: John F. Kline, Londonderry; Frank G. Pensavecchia, Hudson; Stephen M. LaPonsey, Merrimack; Richard A. Williams, Hampstead, all of N.H.

[73] Assignee: Presstek, Inc., Hudson, N.H.

[21] Appl. No.: 836,987

[22] Filed: Feb. 14, 1992

Related U.S. Application Data

[62] Division of Ser. No. 639,199, Jan. 9, 1991.

[51] Int. Cl.$^5$ .................. B41M 1/14; B41C 1/12; B41C 1/05
[52] U.S. Cl. ................................. 101/211; 101/467; 101/401.1
[58] Field of Search ............... 101/211, 465, 466, 467, 101/401.1; 346/162, 163, 164, 1.1; 358/297, 298, 299

[56] References Cited

U.S. PATENT DOCUMENTS 4,729,310  3/1988  Love, III ................ 101/170 X
4,962,385  10/1990  Zlotek ..................... 346/1.1

FOREIGN PATENT DOCUMENTS 0038497  10/1981  European Pat. Off.

Primary Examiner—Clifford D. Crowder
Attorney, Agent, or Firm—Cesari and McKenna

[57] ABSTRACT

A method of reducing printing artifacts in a printing apparatus including a plurality of printing plates, each of which is produced by successive scans of an array of imaging devices wherein the printing artifacts are caused by defective operation of one or more of the imaging devices. Printing artifacts are visually minimized by staggering the imaging devices used to produce separation plates. By staggering the imaging devices, the distance between artifacts can be reduced thereby causing the artifact reproduced in the final composite image to be less accentuated.

2 Claims, 15 Drawing Sheets

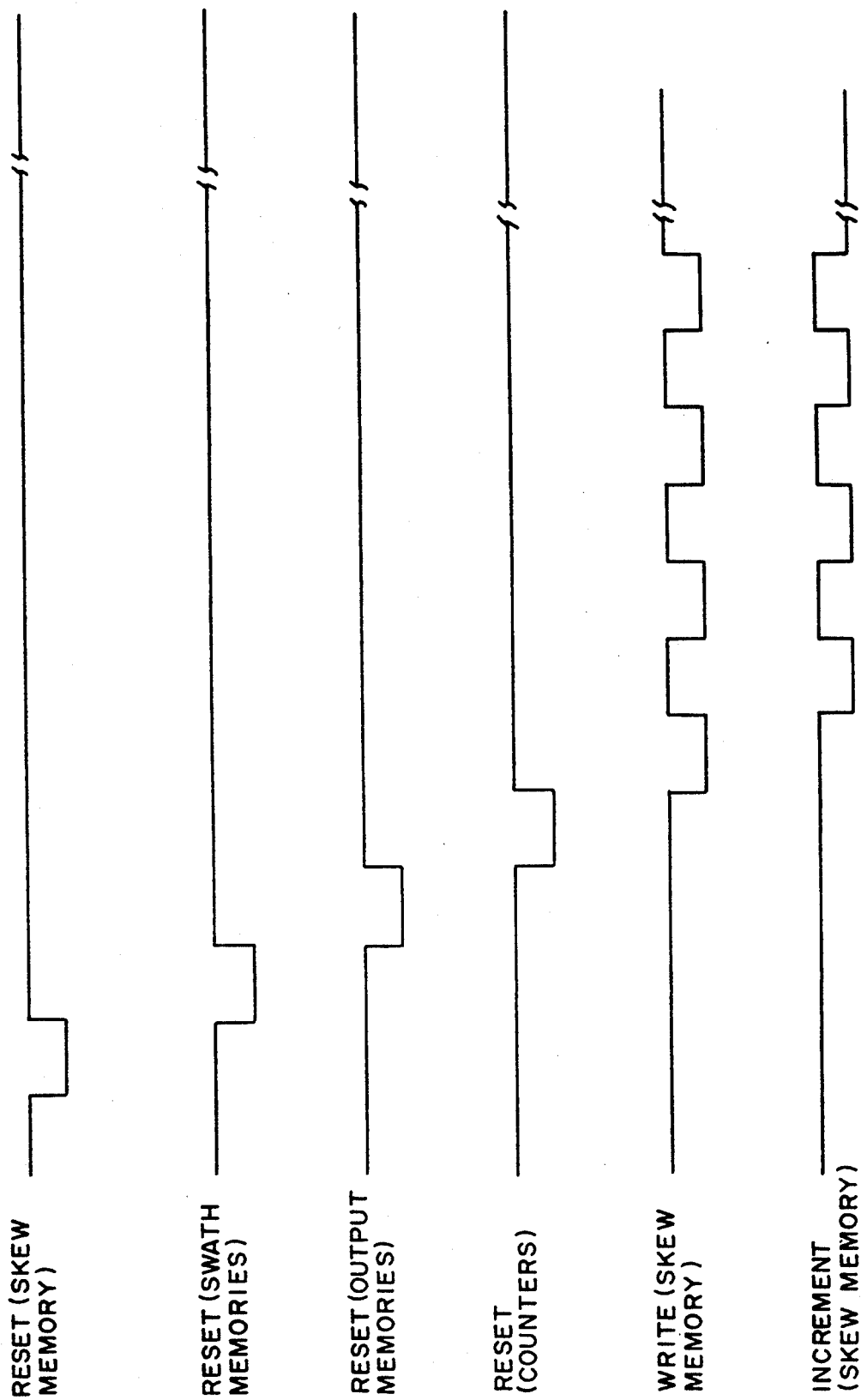

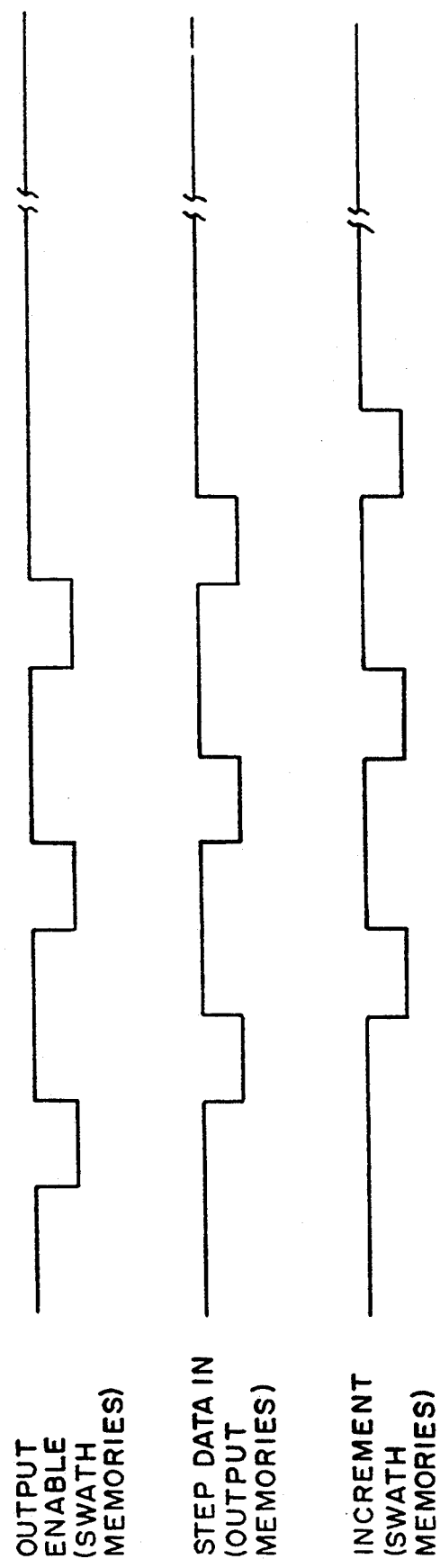

METHOD OF REDUCING PRINTING ARTIFACTS

This is a division of U.S. application Ser. No. 07/639,199, filed Jan. 9, 1991.

BACKGROUND OF THE INVENTION

1. Field of the Invention

The invention relates generally to the field of imaging devices and, more specifically, to control circuitry for digitally operated imaging devices.

2. Discussion of the Prior Art

Various methods and technologies exist for imaging printing plates. These include the use of electromagnetic-radiation pulses, produced by one or more laser or non-laser sources, to create chemical changes at selected points of sensitized plate blanks, which are used (immediately or after exposure to conventional development processes) for planographic printing; ink-jet equipment that is used to selectively deposit ink-repellent or ink-accepting spots on plate blanks, also to produce planographic printing plates; and spark-discharge equipment, in which an electrode in contact with or spaced close to a plate blank produces electrical sparks to alter the characteristics of certain areas on a printing surface, thereby producing "dots" which collectively form a desired image. As used herein, the term "imaging device" includes radiation sources, ink-jet sources, electrodes and other known means of producing image spots on blank printing plates, and the term "discharge" means the image-forming emissions produced by these devices. Multiple imaging devices may be used to produce several lines of image spots simultaneously, with a corresponding increase in imaging speed.

Regardless of the number of imaging devices used, the operation of the imaging devices must be precisely controlled so that the discharges occur at the appropriate times to reach the intended dot locations on the printing surface. If the operation of the imaging devices is not properly controlled, various undesirable characteristics may appear in the image. For example, in imaging systems which image printing plates mounted on rotatable cylinders, a condition which is referred to herein as "slanted swath" may be observed. The slanted swath condition is characterized by lines in the image which run in the axial direction as opposed to the circumferential direction, and which appear "sawtoothed" or jagged instead of straight.

The slanted swath condition may occur as a result of one or a combination of factors. First, in an imaging system which images a rotating cylindrical plate, a mechanism is required to monitor the rotation of the cylinder and provide angular position information for synchronizing the operation of the imaging devices. In order to accurately resolve the correct discharge locations, it is essential to generate precise position information. Such information may be provided by an angular-position encoder which "divides" the circumference of the cylinder into a predetermined number of increments and generates an appropriate output signal (e.g., a series of pulses, each of which represents a unit of distance around the circumference of the cylinder).

If multiple imaging devices are used for imaging, the circumferential distances between such devices must be precisely fixed to represent an integral number of units of circumferential distance. Otherwise, a "dimensional error" between the angular position information and the devices will exist, which will result in premature or delayed firing of the devices with respect to the rotating cylinder, which will in turn result in the slanted swath condition. Typically, normal manufacturing tolerances produce variations in the circumferential distances between devices which represent a significant dimensional error.

Manufacturing tolerances also produce variations in the dimensions (i.e., circumferences) of the printing plate cylinders. Thus, there is a likelihood that in a four-color imaging system which incorporates four separate cylinders (each which is paired with its own set of imaging devices) the four circumferences will not be the same. Accordingly, adjustments must be made to the operation of the imaging devices in order to produce four printing plates whose images are the same size in the circumferential direction. The most expedient way to make such adjustments is to alter the scaling or number of pulses produced by the angular position encoder. However, as described above, any change in the encoder's scaling will produce a dimensional error between the encoder and the imaging devices, which will again result in the slanted swath condition.

Another printing artifact that may occur in digitally imaged printing plates is a series of parallel lines that traverses the printed document along the direction in which the plate was imaged. These lines appear most prominently when the plate-imaging equipment includes multiple-device writing heads, and can arise from any number of causes (such as failure of individual devices to image at the same intensity as other devices, incorrect orientation of the writing head, or improper alignment of individual imaging devices within the head). For example, using a writing head consisting of a diagonal array of non-contact spark-discharge electrodes, we have found that the first electrode to make contact with the plate surface during each pass tends to produce image spots of diminished intensity; thus, streaks of uneven intensity will be produced even with a perfectly assembled writing head. Regardless of the source of the artifact, it will assert itself along each imaging pass, and its visual prominence will be augmented if the same cause affects, in register, all plates used to print an image. Assuming the source can be traced to a single errant imaging device or the stepping accuracy of the entire array, the frequency of the artifact will correspond to the width of the image strip produced by the writing head. Consequently, once an array of devices reaches a critical width, the artifacts it produces will be widely enough spaced to be visible to the eye, particularly where similar artifacts are printed in register.

SUMMARY OF THE INVENTION

The present invention provides an apparatus and method for controlling the discharges used to image printing plates. In a preferred embodiment, the invention is used in an imaging system which includes a press computer, a rotatable cylinder on which a printing plate is mounted, and a writing head which includes multiple imaging devices for producing image spots on the printing surface of the printing plate. The cylinder may be mounted on a platemaking apparatus, or can instead represent the plate drum of the press itself. In accordance with the present invention, the time intervals between discharges may be varied to effectively enlarge or shrink the size of the image in the circumferential direction, as well as to prevent the slanted swath condition. The present invention permits independent control of the timing of the discharges from each imaging device in a multi-device writing head.

The present invention further provides a novel apparatus for sensing the angular position of the rotating cylinder. The apparatus operates on a relatively low-resolution angular position signal to produce a position signal of sufficient resolution to perform high density imaging while preventing the slanted swath condition.

Finally, we provide a method of minimizing the visual prominence of periodic artifacts that derive from characteristics of the writing head. This method is based on the recognition that periodic artifacts occurring in images produced by multiple plates are most apparent when (a) they are in register, and (b) the spacing between artifacts is above the visual limit of resolution. Accordingly, when imaging a plurality of plates with multiple-device heads, we stagger, preferably evenly, the relative starting position of each head so that periodic artifacts are both out of register and spaced together more closely than would otherwise be the case.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 8A and 8B show timing diagram depicting the relationships between various signals generated by the control unit shown in FIG. 3;

DETAILED DESCRIPTION OF AN ILLUSTRATIVE EMBODIMENT

Figure 1:
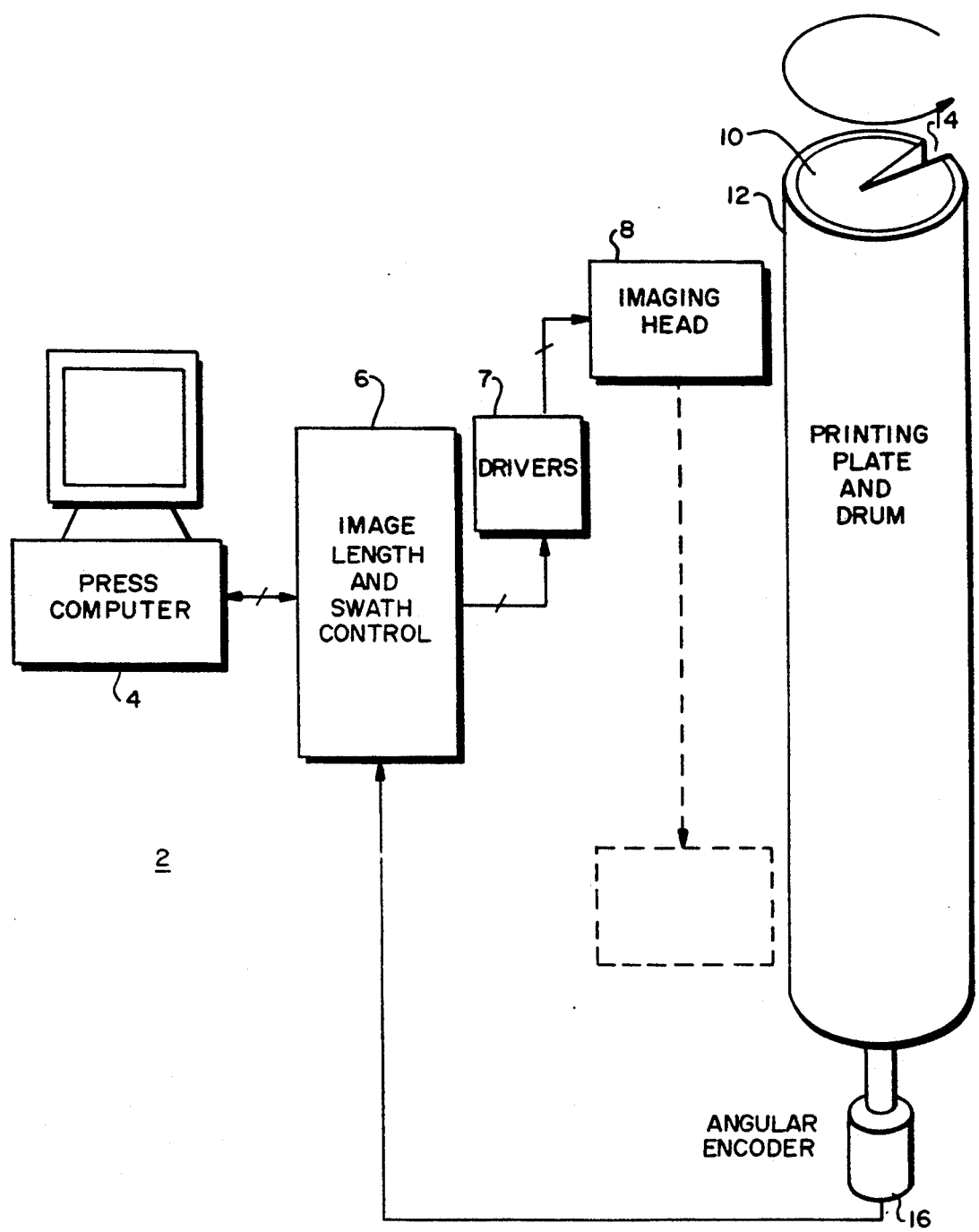
FIG. 1 is a block diagram of an imaging and printing press system which incorporates the present invention.

FIG. 1 depicts, in block diagram form, an imaging station 2, which may represent an independent plate-making apparatus or an integral assembly within a printing press. In the latter case, the station 2 may be used both to image printing plates "on press," and to subsequently print the desired material. It should be understood that multiple stations 2 may be employed to meet the requirements of a particular application. For example, a four-color spark discharge imaging and printing system may employ a total of four stations like the one depicted in FIG. 1.

The station 2 is controlled by a press computer 4. The computer 4 is interfaced to an image length and swath control unit 6. The unit 6 is also interfaced, via drivers 7, to a writing head 8. The head 8 communicates with a printing plate 12 which is mounted on rotatable cylinder 10; the head 8 traverses the plate 12 axially (that is, from one side to the other). The cylinder 10 includes a cut-out portion or void 14 which allows access for securing or removing the printing plate 12. An angular encoder 16 is coupled to one end of the cylinder 10 and to the control unit 6.

For purposes of clarity, other electrical and mechanical components of the station 2 (e.g., a mechanism for rotating the cylinder 10, a mechanism for transporting the head 8 axially across the surface of the plate 12, etc.) are omitted. Examples of such components are described in detail in related U.S. Pat. No. 4,911,075, which is assigned to the assignee of the present invention, and which is hereby incorporated by reference.

The general operation of the station 2 will now be briefly described. Initially, image information in digital form is supplied to the computer 4 by way of a magnetic tape, disk, optical scanner, or other means of data input or transfer. Such information typically includes a data representation of the image which is to be formed on the printing plate 12, as well as related control information. Alternatively, the computer 4 may be used to generate the information necessary to image the printing plate 12.

In order to start the process of imaging the printing plate 12, an operator (not shown) causes the computer 4 to begin sending the necessary image data and control information to the control unit 6. The operator may accomplish this, for example, by using a keyboard, "mouse" or other input device to control the press computer 4. Contemporaneously, the cylinder 10 begins to rotate, and continues to do so with a substantially constant angular velocity. The functions of the control unit 6 are explained in detail below. However, for purposes of understanding the overall operation of the station 2, it is sufficient to say that the control unit 6 regulates the timing with which imaging data is supplied to the drivers 7 and, ultimately, the writing head 8.

As the writing head 8 receives imaging data from the drivers 7, one or more imaging devices (not shown) disposed in the head 8 will either discharge or not discharge, depending upon the binary state of the data. When an imaging device discharges, it forms an image "spot" on the printing surface of the plate 12 (e.g., by ablation or surface transformation following spark discharge, exposure of a sensitized plate surface to radiation, deposition of a coating, etc.). An image spot is actually an area of the printing surface whose characteristics are altered by the discharge.

On each revolution of the cylinder 10, the void 14 passes adjacent to the writing head 8, at which time the imaging devices are idle and no imaging occurs. At that time, the head 8 may be advanced in the axial direction in preparation for further imaging during the next revolution of the cylinder 10. As these steps are repeated, the writing head 8 eventually traverses (scans) the full length of the printing plate 12 in the axial direction (as shown in phantom) and a complete image is formed on the printing surface of the plate 12.

Figure 2B:
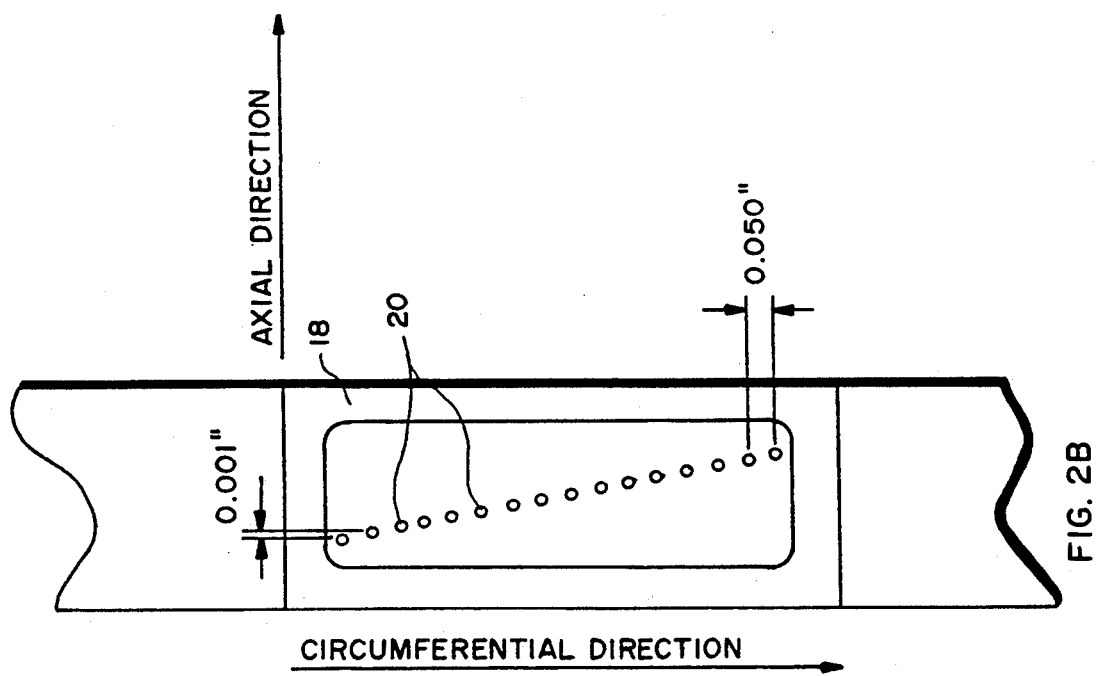
FIG. 2B is a front elevation of the writing head shown in FIG. 2.
Figure 2A:
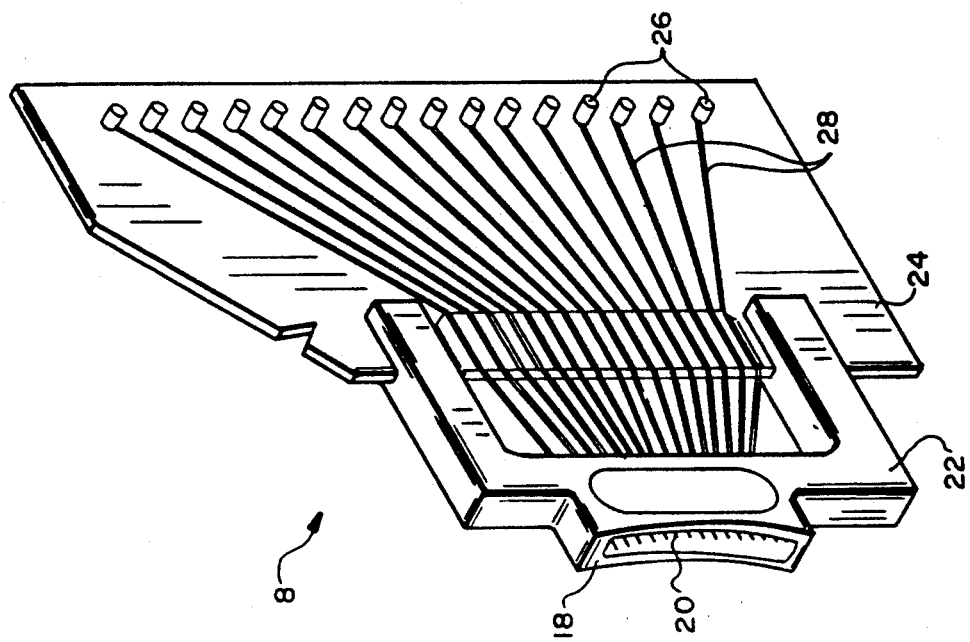
FIG. 2A is a perspective view of a spark discharge writing head.

FIG. 2A is a perspective view of a preferred embodiment of the writing head 8, which is constructed for non-contact spark-discharge imaging. The head 8 includes an open-ended guard 18 which is curved so that it may reside in close proximity to the curved printing surface of the printing plate 12. Disposed within the guard 18 are sixteen individual styli electrodes 20. The head 8 also includes a U-shaped support 22 which holds the guard 18 and the electrodes 20. The support 22 is attached to a printed circuit board (PCB) 24. Sixteen terminals 26 are attached to the rear edge of PCB 24 and each of the electrodes 20 is electrically connected by a lead 28 to one of the terminals 26. The terminals 26 provide suitable electrical connections for connecting the head 8 to other components of the station 2.

As may be seen more clearly in FIG. 2B, the electrodes 20 are arranged along a "diagonal" within the guard 18. (The slope of the "diagonal" in FIG. 2B has been exaggerated for purposes of more clearly illustrating the placement of the electrodes). The electrodes 20 are spaced sufficiently far apart to avoid electrical interference and/or grounding between adjacent electrodes. Because spacing in the axial direction is dictated by the desired resolution level (the spacing being equal to the reciprocal of the dot resolution), the electrodes are separated in the circumferential direction by that distance required to produce the necessary absolute inter-electrode distance. Using a 16-electrode writing head, our preferred spacing is 0.001 inch (1 mil) in the axial direction, and 0.050 inch (50 mils) in the circumferential direction.

Assume, for example, the electrodes 20 are to be used to form image spots which are located on 1 mil centers in both the axial and circumferential directions. Because the electrodes 20 are spaced 50 mils apart in the circumferential direction, the firing of the electrodes 20 must be carefully controlled in order to discharge sparks at the appropriate times to form image spots in the correct locations on the printing surface. In order to achieve spark discharges at the appropriate times, the angular position information produced by the angular encoder 16 must be properly "synchronized" with the physical positions of the electrodes 20 in relation the printing surface. However, regardless of how one attempts to arrange the electrodes 20 and calibrate the encoder 16, it is neither economical nor practical to achieve a perfect dimensional "match" between those components. Accordingly, the present invention provides a method and apparatus for correcting such errors and controlling the size of the image in the circumferential direction.

Figure 3:
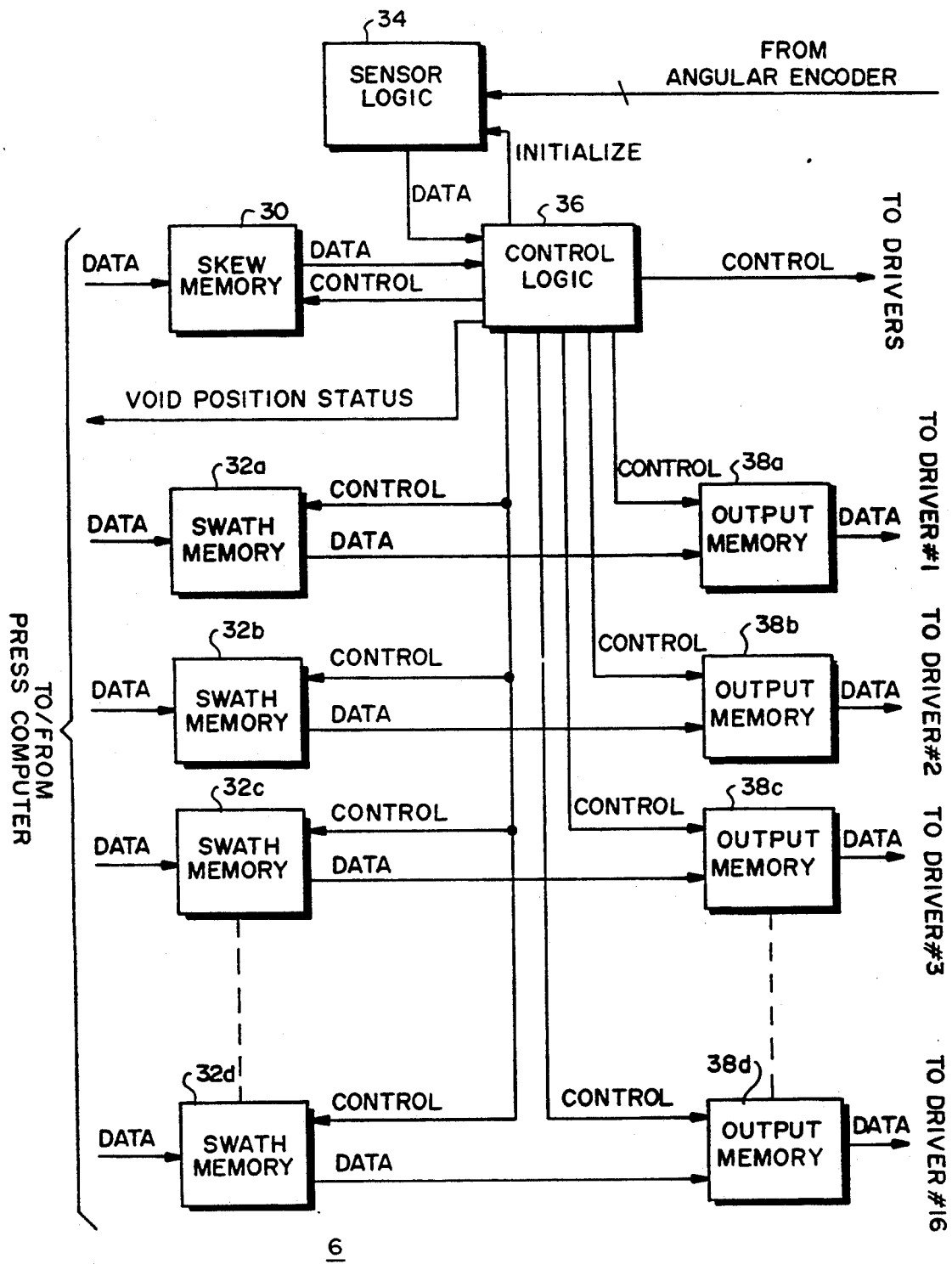
FIG. 3 is a block diagram of the image length and swath control unit shown in FIG. 1.

Referring now to both FIG. 1 and FIG. 3, the control unit 6 includes a skew memory 30 which receives as an input data from the press computer 4. Each of a plurality of swath memories 32 also receives data from the computer 4 as an input. The skew memory 30 provides data as an output to a control logic unit 36, and also receives control information from logic unit 36. Sensor logic unit 34 receives as an input angular position data from the angular encoder 16, and provides as an output enhanced-resolution position data to the unit 36.

Each of a plurality of output memories 38 receives as an input data from an associated one of the swath memories 32. In addition, each output memory 38 receives as an input control information from the unit 36. Each of the output memories 38 provides as an output imaging data, which is transmitted to an associated one of the drivers 7. In addition, unit 36 provides control information to the drivers 7, a void position status signal to the computer 4, and initialization information to the sensor logic unit 34.

Figure 4:
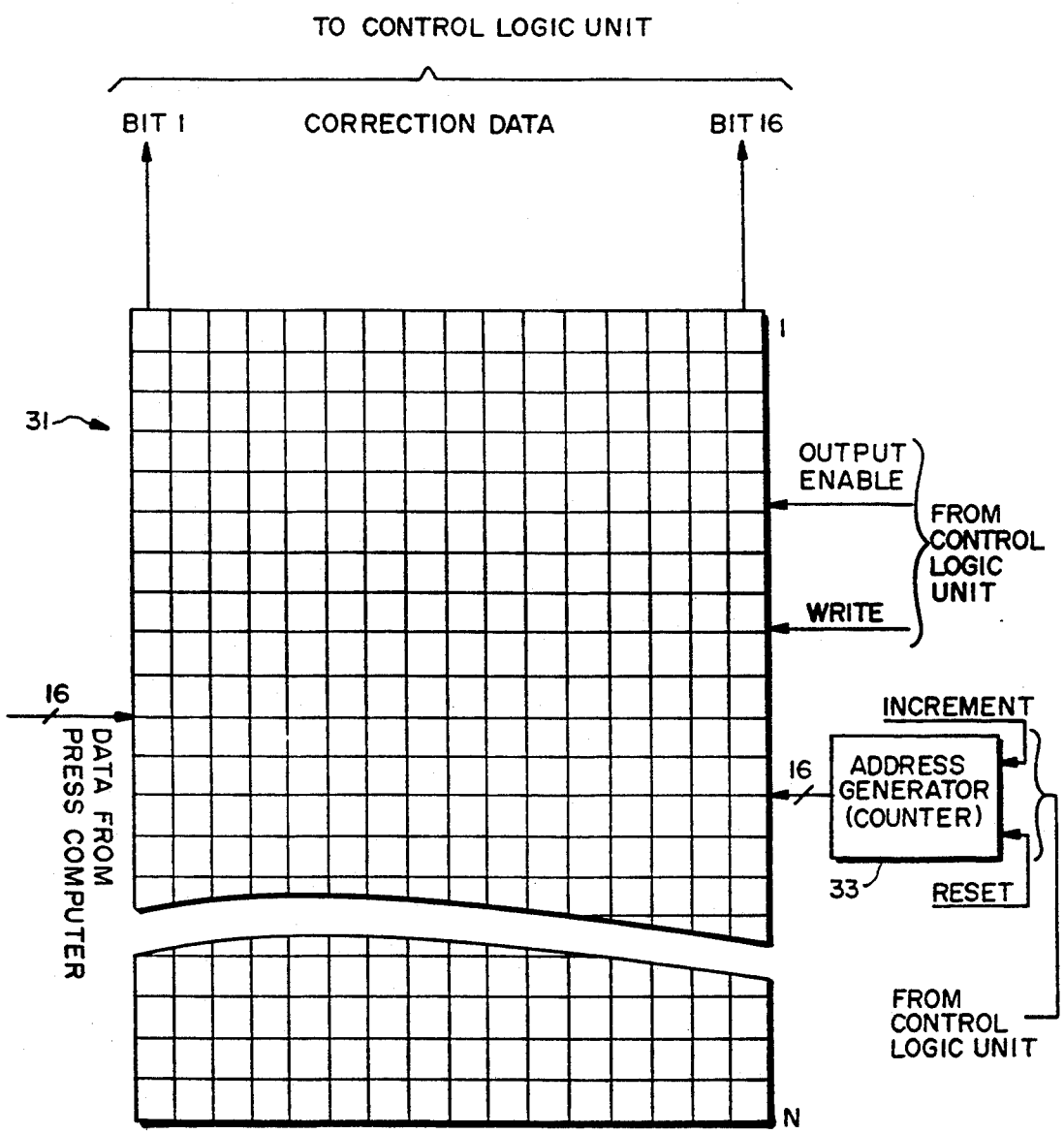
FIG. 4 is a detailed diagram of the skew memory shown in FIG. 3.

FIG. 4 shows a preferred embodiment of the skew memory 30. In this embodiment, the memory 30 includes an area of random access memory (RAM) 31 and an address generator (counter) 33. RAM 31 provides an array capable of storing $N \times 16$ bits of data. RAM 31 is connected to receive sixteen data bits in parallel from the press computer 4, which bits are referred to herein as a "word" of "correction data." RAM 31 is also connected to receive from address generator 33 sixteen address bits in parallel, as well as an OUTPUT ENABLE signal and a WRITE signal from the control logic unit 36. The address generator 33 is connected to receive an INCREMENT signal and a RESET signal from the unit 36. The functions of the various signals applied to the skew memory 30 are explained in detail below.

The RESET signal operates to set the address generator to a predetermined starting address, which is simply the address that is designated to contain correction data corresponding to the first possible discharge location (in a circumferential sense) in a given swath of the imaging area. The term "swath" is used herein to refer to the maximum image area which the writing head 8 can cover during one revolution of the cylinder. The INCREMENT signal causes the address generator 33 to advance the address applied to RAM 31 by one. The WRITE signal permits data received from the press computer 4 to be stored at the address supplied by the address generator 33. The OUTPUT ENABLE signal permits the transmission of a correction data word, stored at the address supplied by the address generator 33, to the control logic unit 36

The size of the skew memory 30 (i.e., the value of N) depends upon the desired image correction resolution and the size (in the circumferential direction) of the image which is to be created For example, if a correction resolution of 0.0001 inch (0.1 mil) is desired and the circumferential length of the image is 16 inches, then the skew memory 30 would need a capacity of $N = 16/0.0001 = 160K$. Assuming that the desired imaging resolution is 1 mil in the circumferential direction, the correction resolution would be ten times greater than the imaging resolution That is, in this example, the skew memory 30 contains ten words of correction data for each 1 mil of distance in the circumferential direction. If a writing head having sixteen electrodes like the one shown in FIG. 2A is used, and the same assumptions are made with respect to the desired resolution, then the skew memory 30 requires a minimum capacity of $160K \times 16$ bits to simultaneously store all of the correction data for one revolution of the plate 12

In a preferred embodiment, the skew memory 30 is implemented using a RAM organized as an array of $262K \times 16$ bits. The additional capacity (approximately 102K) over and above what is strictly needed for the skew memory 30 allows the RAM to be used for other, unrelated purposes when it is not needed to serve as the skew memory. The actual size or configuration of the skew memory 30 may be varied depending upon the desired correction resolution, the number of imaging devices, and other factors such as whether the data stored in the skew memory 30 is compressed or encoded, etc.

With reference again to FIG. 3, the number of swath memories 32 and associated output memories 38 required depends upon the number of imaging devices in the writing head 8; in the embodiment shown, there is one swath memory 32 and one output memory 38 for each imaging device in the writing head. Thus, using the sixteen-device writing head as shown in FIG. 2A as an example, a total of sixteen swath memories 32 and sixteen output memories 38 are required.

Each swath memory 32 is preferably implemented using a RAM and an associated address generator, similar to the arrangement shown in FIG. 4. However, each swath memory 32 is connected to receive imaging data from the press computer 4, as opposed to correction data. The imaging data is a representation of the image which is to be formed on the printing surface of the printing plate 12. In addition, each swath memory 32 and its associated address generator are connected to receive OUTPUT ENABLE, WRITE, INCREMENT and RESET signals from the control logic unit 36, which signals are functionally similar to, but separate from, the signals applied to the skew memory 30.

The size of each swath memory 32 depends upon the maximum number of image-spot locations in the circumferential direction per revolution of the printing plate 12 (imaging resolution). For example, if image spots on 0.001 inch (1 mil) centers are desired and the circumferential length of the image is 16 inches, the maximum number of locations for one revolution of the plate 12 is $16/0.001 = 16,000$ locations for each imaging device. Therefore, in this example, each swath memory 32 requires a capacity of 16K bits in order to simultaneously store one bit of imaging data for each possible image-spot location along one revolution of the plate 12.

It should be noted, however, that it is not necessary to use sixteen separate memories to implement the swath memories 32. Preferably, a single RAM organized as an array of $16K \times 16$ bits is used to physically implement sixteen swath memories 32. Again, the size or configuration of the swath memories 32 may be varied depending upon the requirements of a particular application, such as the required imaging speed, the circumferential length of the image, whether the imaging data is encoded or compressed, the desired imaging resolution and the like.

In contrast to the swath memories 32, each of the output memories 38 preferably comprises a conventional first-in-first-out (FIFO) memory having six one-bit storage locations. In order to provide independent control of the discharge from each individual imaging device, the advantages of which are explained below, it is preferred that the output memories 38 be implemented as separately controllable units.

Figure 5:
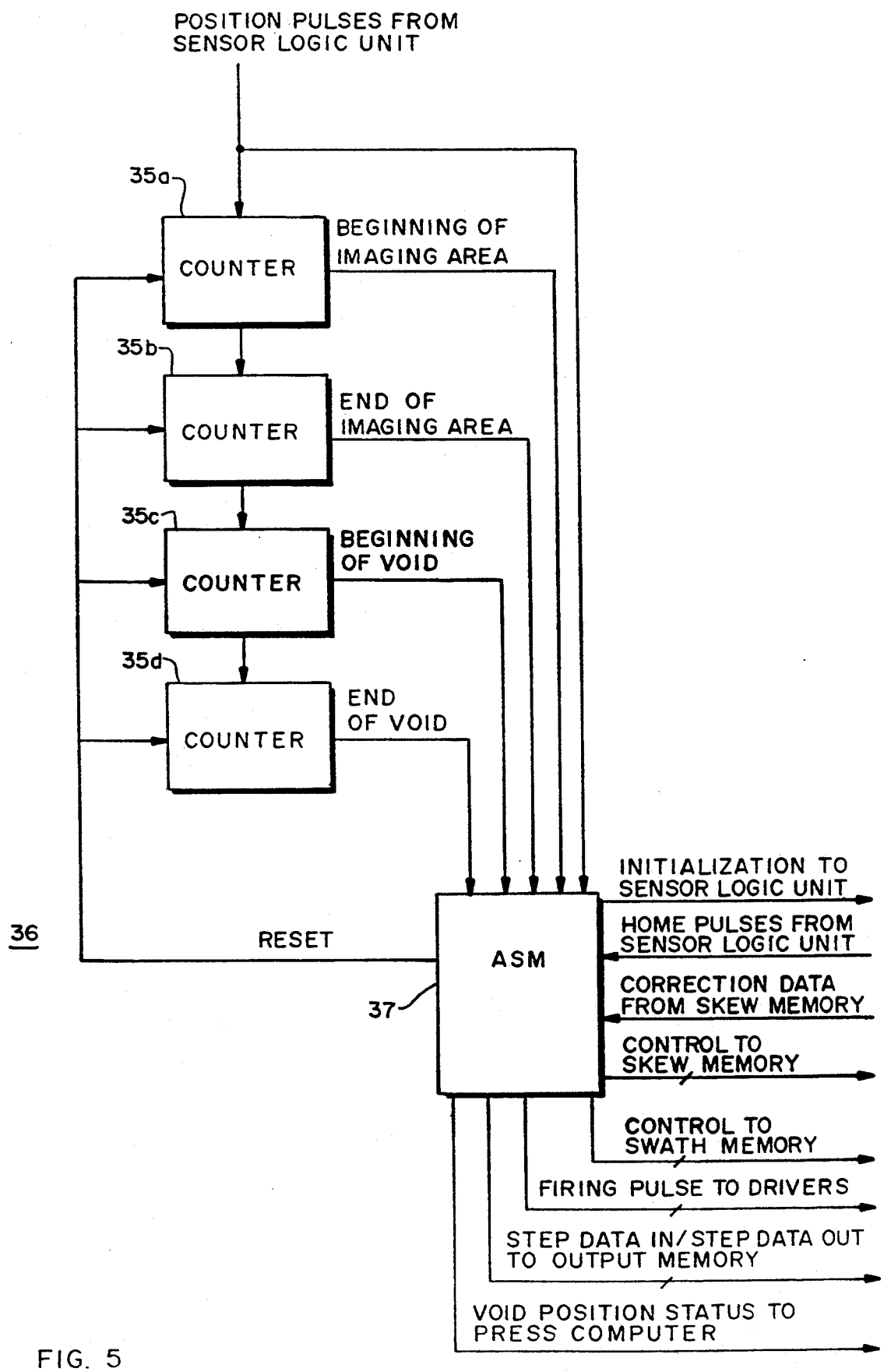
FIG. 5 is a detailed diagram of the control logic unit shown in FIG. 3.

FIG. 5 depicts a preferred embodiment for the control logic unit 36. The unit 36 includes four counters 35 which are interconnected with an algorithmic state machine (ASM) 37. Counter 35a is connected to receive position pulses from the sensor logic unit 34. Each of the position pulses from unit 34 represents a predetermined unit of distance in the circumferential direction around the printing surface of the printing plate 12. Preferably, each position pulse produced by the unit 34 represents 0.0001 inch (0.1 mil) of distance in the circumferential direction.

ASM 37 may be implemented, for example, by storing data in a programmable read-only memory (PROM) which represents a control algorithm. That is, for each possible combination of address signals that is applied to the PROM, a predetermined combination of output (data) signals are produced by the PROM. It should be understood that control logic unit 36 may be implemented in any of a variety of ways depending upon the requirements of a particular application. For example, a microprocessor or microcontroller, along with an area of nonvolatile memory for storing instructions, may be programmed in a conventional manner to perform the functions of ASM 37.

ASM 37 is connected to receive both position pulses and home pulses from the sensor logic unit 34. A home pulse is preferably a single pulse which occurs once per revolution of the cylinder 10, which serves as a marker to indicate when a revolution is completed.

Counters 35 produce output signals which indicate when the following conditions occurs: (1) the beginning of the imaging area on the printing surface of the plate 12 is approaching the writing head 8; (2) the end of the imaging area is approaching; (3) the beginning of the void 14 is approaching; or (4) the end of the void 14 is approaching. It should be noted that the term "imaging area," as used herein, means the portion of the total printing surface area in which an image may be formed, and excludes the "margins" or borders which are left blank. These conditions are detected in a straightforward manner by first initializing each of the counters 35 to a predetermined value, and then incrementing the appropriate counter in response to the position data received from the sensor logic unit 34.

For example, assume that just as a revolution of the cylinder 10 is completed, the counters 35 are initialized to predetermined starting values The starting values for the counters are initially calculated by knowing the circumferential distance represented by each position pulse, the circumference of the plate 12 and the angular extents of the void 14 and imaging area. The starting values are preferably chosen such that each counter 35 will reach its maximum value contemporaneously with the occurrence of the condition of interest (e.g., the beginning of the void). Initialization of the counters 35 occurs when a RESET signal is applied to the counters by the ASM 37, at which time each counter is set to a value represented by the signals present at the inputs of the counter.

As the cylinder 10 begins a revolution, position pulses are received by the counter 35a, which is incremented by each such pulse. When the counter 35a reaches its maximum, an BEGINNING OF IMAGING AREA signal is transmitted to the ASM 37, which indicates that the beginning of the imaging area is almost adjacent to the writing head 8. Contemporaneously, the position pulses are applied to counter 35b, which begins to increment in response thereto. Thus, in succession, each of counters 35b, 35c and 35d reaches its maximum value and transmits its respective signal to the ASM 37. The entire process is repeated for each revolution of the cylinder 10.

The control information supplied by ASM 37 to the output memories 38 consists of three signals: STEP DATA IN, STEP DATA OUT and RESET. The STEP DATA IN signal operates to serially load (from the output of the associated swath memory 32) a single data bit into the output memory 38, while the STEP DATA OUT signal is used to serially transmit a single data bit from the memory 38 to an associated driver 7. The RESET signal clears the output memories 38.

The control information supplied by ASM 37 to the drivers 7 consists of pulses which are used to initiate firing of the imaging devices, which pulses are described below in connection with FIG. 9A.

The detailed operation of the control logic unit 36 will now be described, with reference to FIGS. 5, 6 and 8A. Operation starts at step 42 upon power up of the station 2. The unit 6 initializes at step 44, during which the ASM 37 issues a RESET signal to the skew memory 30, which operates to set the address generator 33 to the predetermined starting address previously described. Similarly, the ASM 37 issues a RESET signal to the swath memories 32, which sets the address generator(s) associated with such memories to predetermined starting addresses. The starting address for a swath memory 32 is simply the address which is designated to contain imaging data corresponding to the first image spot (whether blank or not) of a given swath of the image. A RESET signal is also issued to the output memories 38, which clears them. The unit 36 also provides initialization information to the unit 34 (which is described below in connection with FIG. 10) and sets the four counters within the unit 36 which are used to determine the boundaries of the imaging area and the void 14.

In addition, the skew memory 30 is loaded by the computer 4, in cooperation with the unit 36, with predetermined correction data which will be used to prevent the slanted swath condition and to control the size of the image in the circumferential direction. The loading of the skew memory 30 entails the assertion of a WRITE signal from the unit 36, followed by transmission of a word of correction data from the computer 4, which word is stored in the skew memory 30 at the address specified by the address generator 33. An INCREMENT signal is then issued from the unit 36, which increments the address generator 33. This process continues until all of the correction data is stored in the skew memory 30. In general, the skew memory 30 is loaded only once during initialization and the correction data stored therein is used for all subsequent imaging.

A method for deriving the correction data used in the skew memory 30 will now be described. In this example, assume that a four-color imaging and printing system having four imaging stations 2 is used. Further assume, as before, that an imaging resolution of 1.0 mil and a correction resolution of 0.1 mil are desired.

Figure 7A:
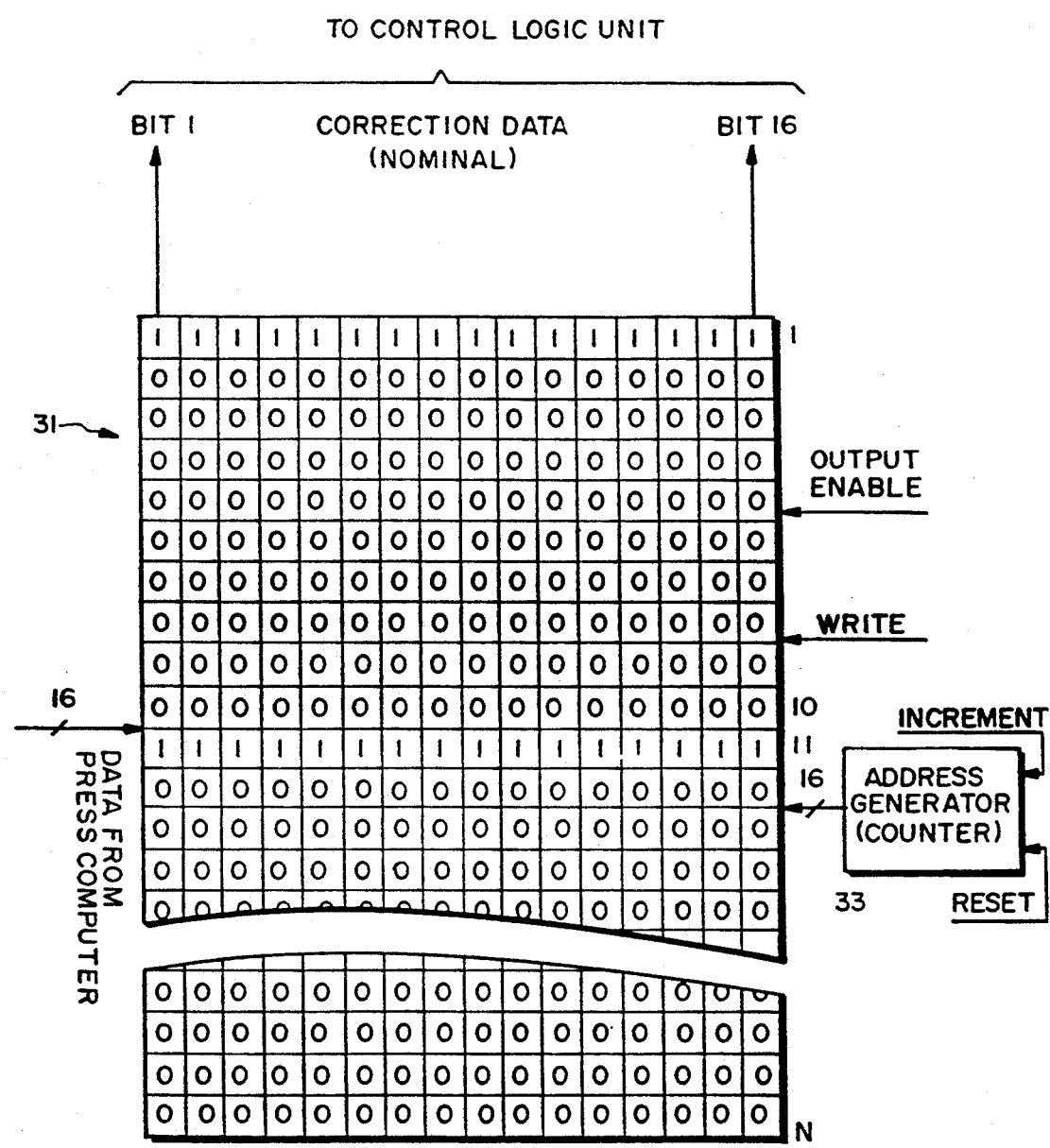
FIG. 7A is a diagram showing correction data stored in the skew memory.

First, each of the four imaging stations 2 is used to image and print a "standard" test pattern. For these test pattern runs, the skew memory 30 is loaded with "nominal" or neutral correction data, which essentially allows the test pattern image data to pass through to the drivers 7 without adjustment in the circumferential direction. As shown in FIG. 7A, "nominal" correction data for the skew memory 30 may consist of storing all binary ones at the first address of the skew memory 30 (corresponding the first possible discharge location on a given revolution of the cylinder 10), followed by all binary zeros in the next nine successive addresses, and repeating this pattern through the entire skew memory 30. The effect of such "nominal" correction data is simply to allow one bit of imaging data to be advanced from the output memories 38 to the drivers 7 every 1.0 mil of distance in the circumferential direction, which represents the distance between nominal image-spot locations.

Figure 7B:
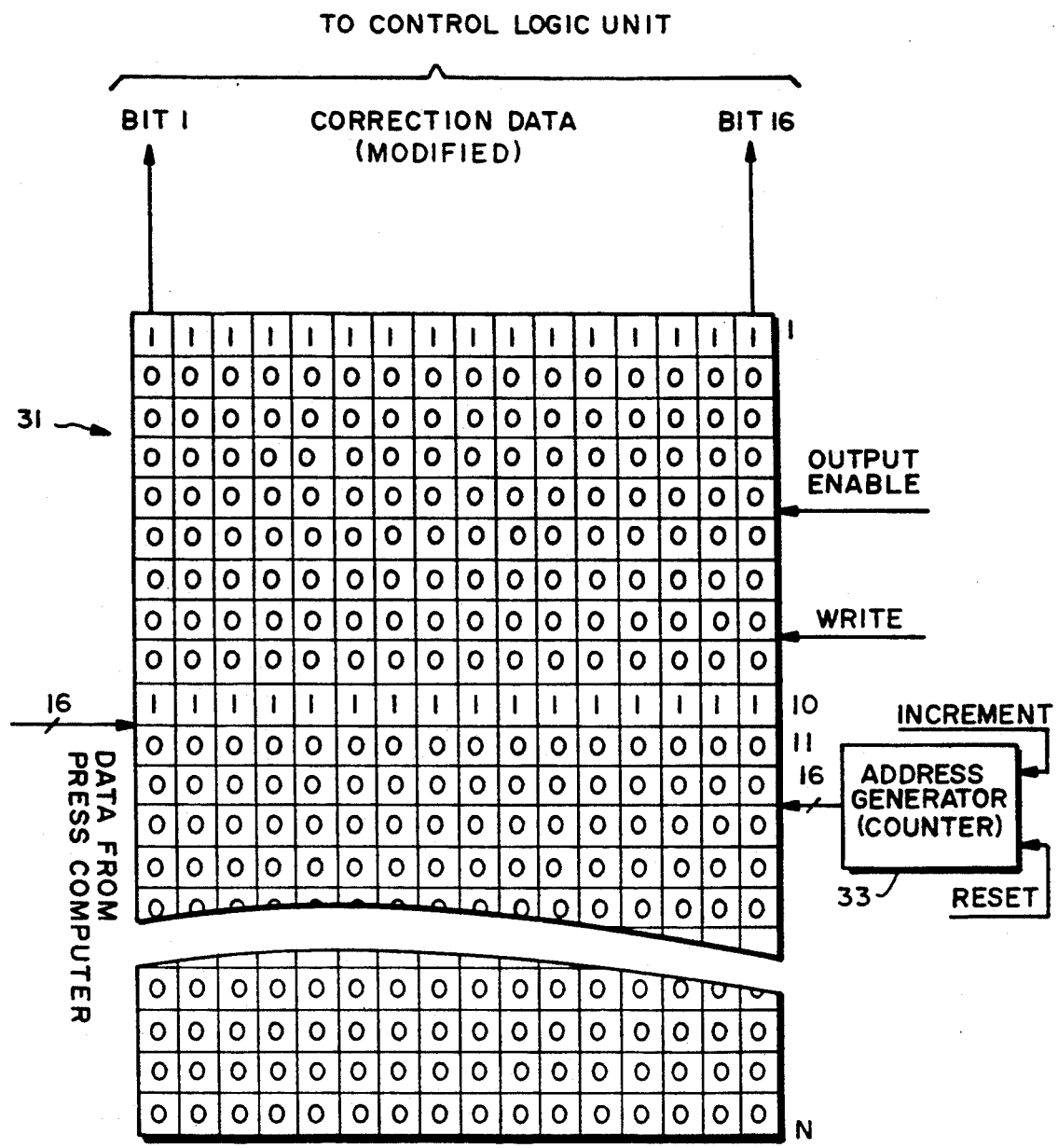
FIG. 7B is a diagram showing modified correction data stored in the skew memory.

Once the test images are complete, physical measurements can be made to determine by how much the image sizes differ. From these measurements, one may calculate how much to shrink or increase the image produced by each imaging station in order to achieve four images of the same size. The desired shrinkage or enlargement is implemented by altering the "nominal" correction data. Assume that it is necessary to shrink the length of an image by 0.1 mil. This could be implemented by modifying the correction data as shown in FIG. 7B. There, the correction data word stored at the tenth address of memory 30 is changed to all binary ones, meaning that the corresponding imaging data is advanced to the drivers 7 at a slightly earlier time (i.e., 0.1 mil in circumferential distance) as compared to the nominal correction data shown in FIG. 7A. Thus, if the remaining correction data is unchanged, the circumferential length of the image decreases (shrinks) by 0.1 mil.

Desired amounts of enlargement or shrinkage in the circumferential direction, within the limits of the imaging area of the printing plate 12, may be spread uniformly, or otherwise, across the length of the image by selectively altering the correction data values stored in the skew memory 30.

Referring again to FIG. 6, at step 46, the swath memories 32 are loaded with imaging data for the first swath to be imaged on the printing surface of the plate 12. The swath memories 32 are loaded in a manner similar to that described above with respect to the skew memory 30, except that imaging data is loaded instead of correction data. Using again the assumptions of a circumferential image length of 16 inches and image spots on 1 mil centers, a total of $16K \times 16$ image data bits are loaded by the press computer 4 into the swath memories 32 during step 46.

At step 48, as shown in FIG. 8B, the unit 36 issues an OUTPUT ENABLE signal to the swath memories 32 and a STEP DATA IN signal to the output memories 38, which causes the first data bits appearing at the outputs of the memories 32 (collectively, a sixteen-bit word of image data) to be advanced into the first storage locations of memories 38. The unit 36 then issues an INCREMENT signal to all of the swath memories 32, which causes their respective address generators to increase by one. An OUTPUT ENABLE signal is again issued to the swath memories 32 and the steps are repeated until a total of three bits of image data are stored in each of the output memories 38, and the address generators for the swath memories 32 are set to the addresses for the fourth bits of image data.

Once the first three bits of the first swath of image data are advanced into the output memories 38, the station 2 is ready to actually start imaging at step 50. By this time, if not earlier, the cylinder 10 is rotating at a generally constant angular velocity, and angular position data generated by the sensor logic unit 34 is transmitted to the unit 36. The unit 36 also receives a word of correction data from the skew memory 30 (the word stored at the address corresponding to the predetermined starting address). By detecting the receipt of a home pulse, the unit 36 may associate or synchronize a known angular position of the cylinder 10 with this first word of correction data. Preferably, the first word of correction data is synchronized with the first possible discharge location of a given swath, thereby synchronizing subsequent correction data words sequentially with successive possible discharge locations.

Each correction data word stored in the skew memory 30 indicates whether the image data for a particular imaging device should be advanced to the drivers 7. In a preferred embodiment, the eighth bit (corresponding to the eighth imaging device of a sixteen-device writing head) of the sixteen-bit correction data words is used to indicate when the next word of image data stored in the swath memories 32 should be advanced to the output memories 38. If the eighth bit of the output word from the skew memory 30 is a binary one, the imaging control process continues to step 54.

Although the eighth bit of the correction data words has been chosen for purposes of illustrating the "trigger" for advancing data from the swath memories 32 to the output memories 38, the ninth bit would function in a comparable manner. The significance of the eighth bit is that it corresponds to the eighth imaging device, which is physically close to the exact middle of a sixteen-device swath. Therefore, the eighth bit (imaging device) is a logical choice as a "reference" whose actual discharge location is neither advanced nor retarded from its nominal location. Viewed another way, only the discharges corresponding to bits other than the eighth bit are subject to being moved forward or backward, thus producing a skew about the eighth bit.

During step 54, the unit 36 issues a STEP DATA OUT signal to those output memories 38 whose corresponding bits in the output word from the skew memory 38 are binary ones. Due to the conditional test of step 52, it is known that at least the eighth bit of the output word from the skew memory 38 is a binary one. Therefore, at least that output memory 38 which corresponds to the eighth imaging device will be issued a STEP DATA OUT signal at this time. Depending upon the binary values for bits 1-7 and 9-16 of the output word from the skew memory 30, the output memories 38 which correspond to those bits may be issued their STEP DATA OUT signals slightly before or slightly after that which is issued with respect to the eighth imaging device. In this fashion, each output memory 38, and the firing of its associated imaging device, may be independently controlled by the unit 36.

The potential time differences in the issuance of the STEP DATA OUT signals to different output memories 38 represent a "skewing" of the image data as it is presented to the drivers 7, and ultimately to the imaging devices. It is this skewing which effectively compensates for any error between the angular encoder 16 and the imaging devices.

Also during step 54, in conjunction with the issuance of the STEP DATA OUT signals, the unit 36 sends a control signal to the drivers 7 which actually initiates the discharge of the individual imaging devices. The unit 36 then asserts an INCREMENT signal to the swath memories 32, which causes the next word of image data to appear at the outputs of the memories 32. This is followed by a STEP DATA IN signal to the output memories 38 which advances the data word into the output memories 38. The skew memory 30 address is then advanced at step 56 by the assertion of the INCREMENT signal by the unit 36.

If, during step 52, the eighth bit of the output word from the skew memory 30 is not a binary one (meaning that no image data is to be advanced to the output memories 38 at that particular time), the imaging control process bypasses step 54, and moves to step 56 in which the unit 36 issues an INCREMENT signal to increment the address of the skew memory 30. In response, the next sequential word is output by the skew memory 30 and is examined by the unit 36. If any of the bits of the output word is a binary one, the unit 36 will issue a STEP DATA OUT signal to the corresponding output memory 38 and also send the appropriate control signal to the drivers 7.

Recalling the example from above, in which the desired correction resolution was 0.1 mil and the imaging resolution was 1.0 mil, one will remember that the skew memory 30 contains ten words of correction data corresponding to each 1.0 mil of circumferential distance. That explains why the address of the skew memory 30 is advanced multiple times between advances of the swath memories' addresses. Therefore, by specifying which bits of the words stored in the skew memory 30 contain a binary one, the actual discharge locations may be moved forward or backward (circumferentially) by a desired number of 0.1 mil increments to prevent the slanted swath condition and to adjust the image size.

At step 58, the unit 36 checks the cumulative number of position pulses received from the unit 34 since the beginning of the current revolution of the cylinder 10. Based on the pulse count, the unit 36 determines whether the cylinder 10 has rotated sufficiently far so that the writing head 8 has reached the end of the imaging area for the current swath (e.g., is the END OF IMAGING AREA signal present). If the end of the imaging area has not been reached, the imaging control process returns to step 52 and, as before, checks the eighth bit of the output word from the skew memory 30 to determine whether to advance additional image data to the drivers 7.

If, during step 58, it is determined that the current swath is complete, meaning that the void 14 is approaching the writing head 8, the process continues to step 60 during which the unit 36 asserts the VOID POSITION STATUS signal. While that signal is asserted, the press computer 4 is permitted to transmit new image data into the swath memories 32. As the void 14 completes its pass by the head 8 (the END OF VOID signal occurs), the unit 36 stops asserting the VOID POSITION STATUS signal and the computer 4 is prevented from transmitting further imaging data to the swath memories 32.

During step 62, the unit 36 determines whether the image is complete. That determination is made by checking the swath memories 32 to determine whether new image data was actually loaded by the press computer 4. If not, meaning that no more image data remains, the image is complete and the process ends at step 64. If so, meaning that there is at least one more swath of imaging to perform, the process returns to step 48 and proceeds as before. Steps 60 and 62 are preferably executed during the period of each revolution when the void 14 is adjacent to the writing head 8, thus allowing the station 2 to prepare to image the next swath during the time when the writing head 8 is normally idle.

Figure 9A:
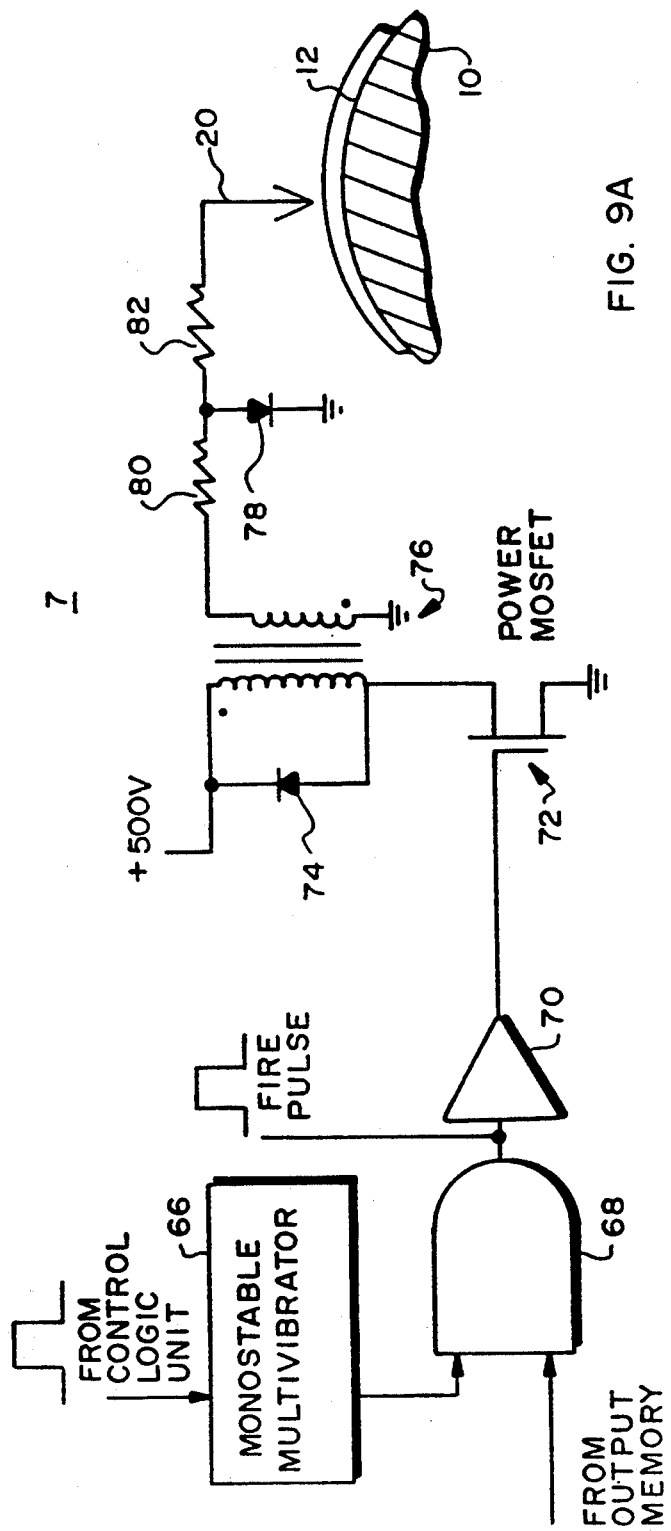
FIG. 9A is a schematic circuit diagram of the driver shown in FIG. 1.

FIG. 9A is a circuit diagram of a suitable one of the drivers 7 shown in FIG. 1, configured to operate a spark-discharge electrode. A monostable multivibrator 66 is connected to receive, as inputs, pulses from the control logic unit 36. An output of the multivibrator 66 is connected to one input of an AND gate 68. A second input of the AND gate 68 is connected to receive imaging data from one of the output memories 38. An output of the AND gate 68 is connected to the input of a high speed, high current MOSFET driver 70, whose output is connected to the gate of a MOSFET 72. The source of the MOSFET 72 is connected to ground potential.

A primary winding of a transformer 76 is connected between the drain of the MOSFET 72 and a voltage supply (500 VDC). A diode 74 is connected in parallel with the primary winding, with the anode of the diode connected to the drain of the MOSFET 72. One end of a secondary winding of the transformer 76 is connected to ground potential. A resistance 80 is connected between the second end of the secondary winding and the anode of a diode 78, whose cathode is connected to ground. A resistance 82 is connected in series between resistance 80 and an electrode 20.

Figure 9B:
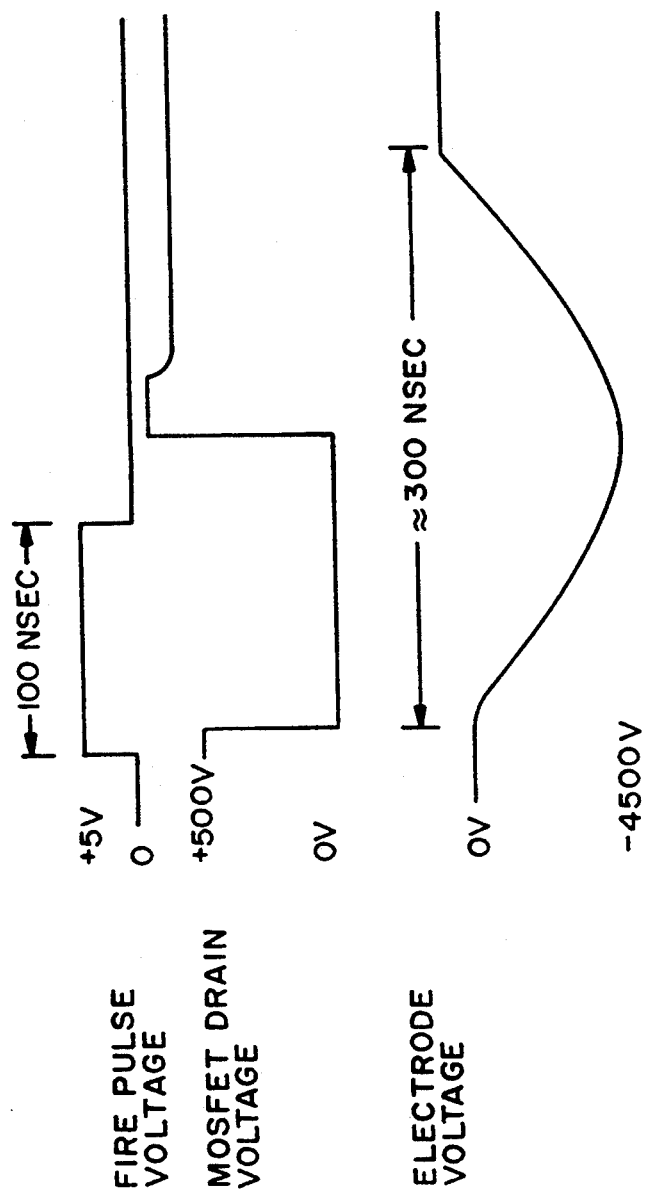
FIG. 9B depicts three voltage waveforms which are related to the circuitry of FIG. 9A.

The operation of the driver circuit 7 may be understood best with reference to both FIGS. 9A and 9B. As imaging data is applied from the output memory to the AND gate 68 and a pulse is output from the multivibrator 66 in response to a control signal from unit 36, AND gate 68 generates a fire pulse, which is amplified by driver 70 and applied to the gate of MOSFET 72. It should be apparent that only imaging data having a binary value of one associated with a predetermined voltage level will generate a fire pulse, since the complementary binary value (zero) simply means that the space is to be left blank.

The duration of the fire pulse is on the order of 100 nanoseconds and its magnitude is approximately 5 V. In response to the fire pulse, the drain voltage of the MOSFET 72 decreases rapidly from the supply voltage to zero. In turn, there is a rapid decrease of the electrode voltage (referenced to the cylinder 10, which is connected to ground potential) to approximately $-4,500$ volts, which results in discharge of a spark from the electrode 20 to the printing surface of the printing plate 12, thereby forming an image spot.

In order to achieve satisfactory imaging speeds, the driver circuit 7 must and does achieve a rise time on the order of $10^9$ volts/second in producing the electrode voltage. In addition, protection should be provided such that excessive currents and incorrect electrode voltage polarity are avoided. Resistance 82 serves to limit the current delivered to the electrode 20, while resistance 80 in combination with diode 78 provide a clamp which prevents the polarity of the electrode voltage from becoming positive with respect to ground.

Figure 10:
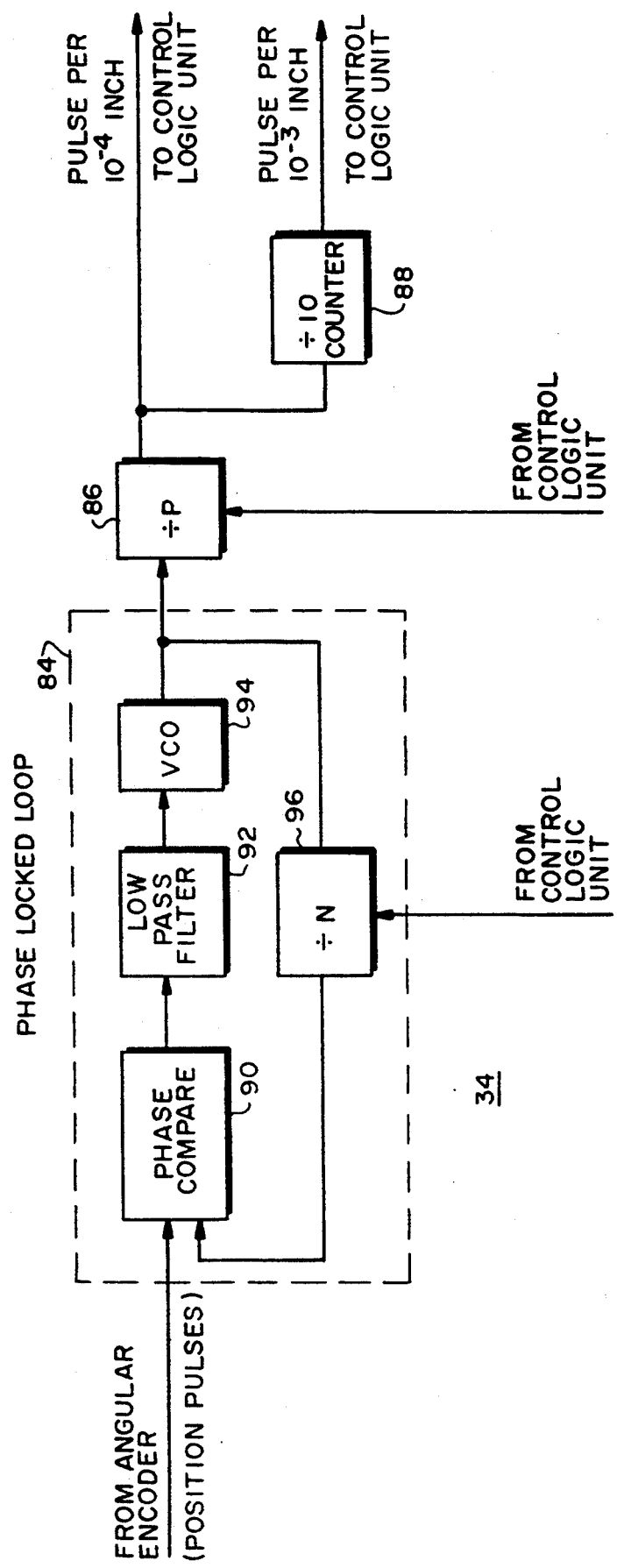
FIG. 10 is a schematic circuit diagram of the sensor logic shown in FIG. 3.

FIG. 10 is a circuit diagram of the sensor logic unit 34 shown in FIG. 3. The major components of the unit 34 are a phase locked loop (PLL) 84, a first programmable divider 86 and a second programmable divider 88. PLL 84 consists of a phase comparator 90 having a first input which is connected to the angular encoder 16 (FIG. 1). An output of the comparator 90 is connected to the input of a low pass filter 92. The output of the filter 92 is connected to the input of a voltage controlled oscillator (VCO) 94. The output of the VCO 94 is fed back, via the divider 96, to a second input to the comparator 90. Lastly, the output of the VCO 94 is connected to the input of the divider 86.

Figure 6:
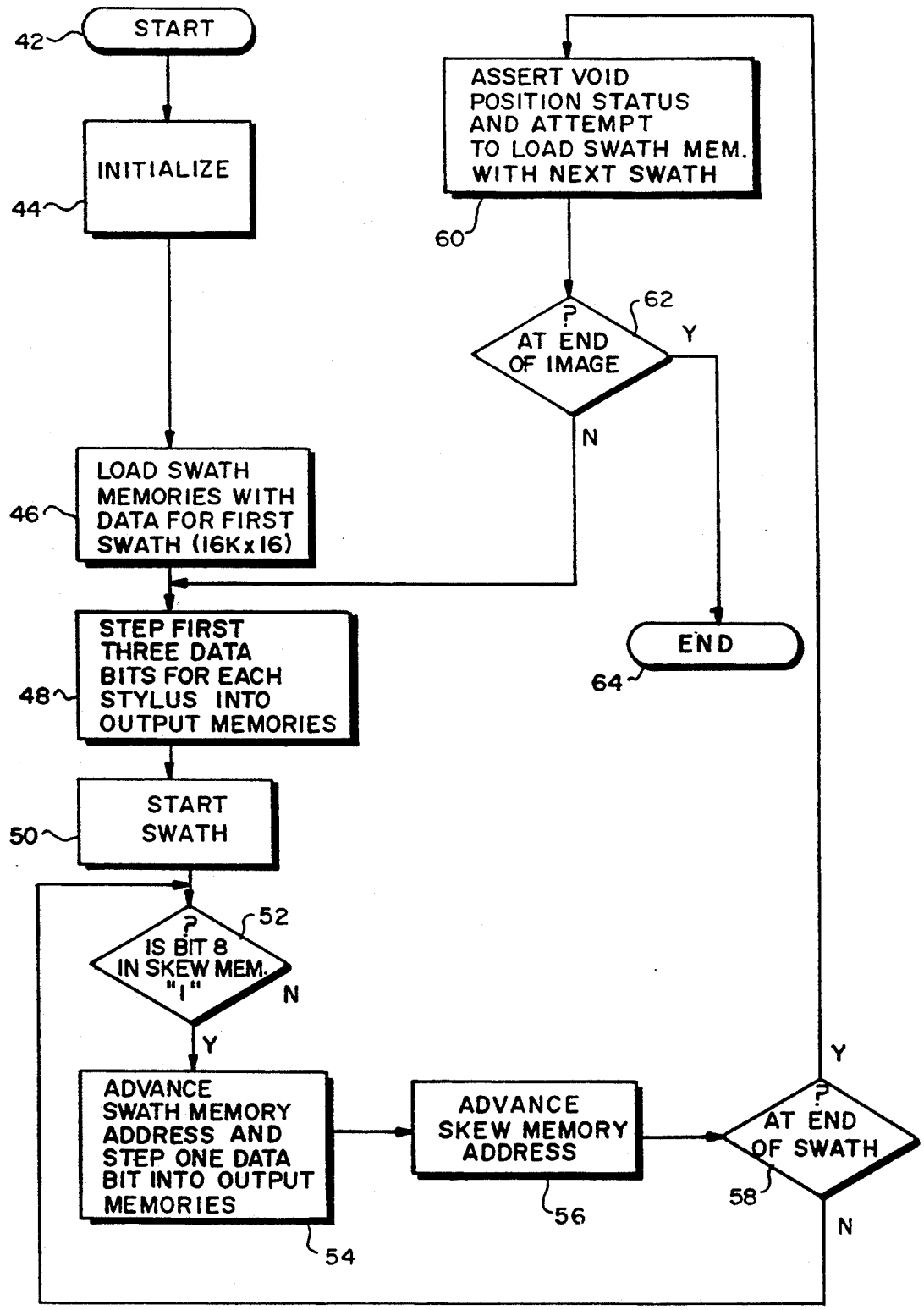
FIG. 6 is a flowchart diagram showing the operational steps performed by the image length and swath control unit shown in FIG. 3.

The dividers 86 and 96 are programmed by the unit 36 as part of the initialization step 44 (FIG. 6). That is, each divider is loaded with a integer value (P or N) which functions as its divisor. The selection of appropriate integer values depends on several factors, including the desired position resolution, the resolution of the angular encoder 16 and the diameter of the plate cylinder. As an example, assume that the divisor $P=1$, the encoder generates $2.5 \times 10^3$ pulses per revolution, the desired position resolution is 0.1 mil in the circumferential direction, and the plate cylinder has a 8 inch diameter. Thus, to calculate the value of N, one would first calculate that there are (pi)(8 inches)/0.001 inch $= 2.513 \times 10^5$ increments (each 0.1 mil in length) around the circumference of the cylinder. Therefore, $N=2.513 \times 10^5/2.5 \times 10^3 = 100$ or 101 rounded to the nearest integer. However, if $N=100$, each incremental integer change in N represents a change of approximately 1% in distance per pulse, which may introduce unacceptable error.

A solution to this problem is to simply multiply both P and N by the same value. If, in the last example, $P=10$ and $N=1000$, then an incremental integer change in the value of N represents a change of approximately 0.1% in distance per pulse. Moreover, even though the angular encoder produces only 2,500 pulses per revolution, the output of divider 86 provides 250,000 pulses per revolution or one pulse for each 0.1 mil of distance in the circumferential direction.

It should be apparent that other desired resolutions may be obtained by altering the values of the divisors.

In effect, the sensor logic unit 34 operates to enhance a relatively low resolution angular position signal produced by the angular encoder to yield a position signal having a substantially enhanced resolution. As a result, a relatively inexpensive, off-the-shelf angular encoder may be employed, yet sufficient angular position resolution is obtained.

Figure 11A:
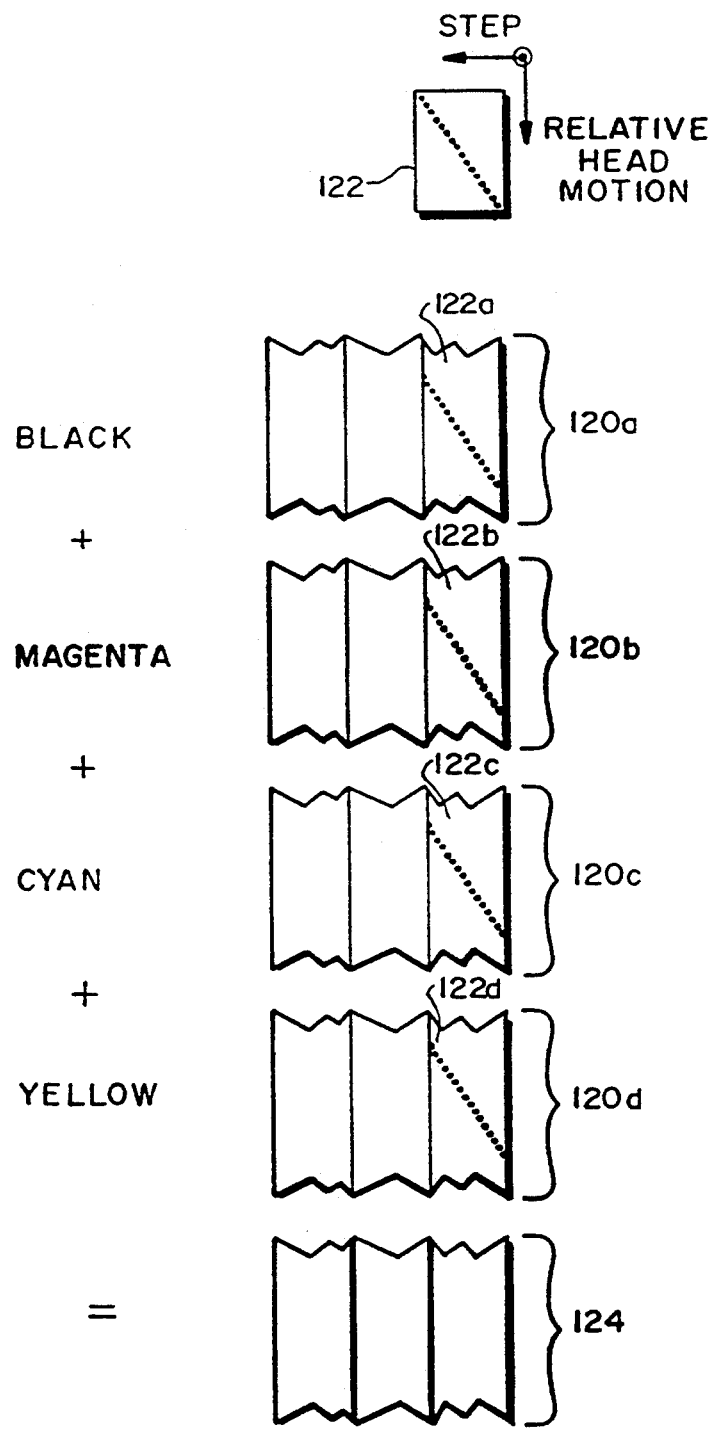
FIG. 11A is a schematic representation of a periodic artifact and the source thereof.

We will now discuss minimization of periodic "streaking" artifacts associated with multiple-device writing heads. Refer to FIG. 11A, which shows a series of complementary image fragments 120a, 120b, 120c and 120d printed by black, magenta, cyan and yellow printing plates, respectively. Each plate is imaged by an independent image or writing head depicted generically at 122 and shown schematically at 122a, 122b, 122c and 122d. Each head itself includes 16 imaging devices that traverse the plate in the indicated direction of relative motion. At the conclusion of each circumferential scan (and before the beginning of the next scan), the head is shifted, or stepped, to the left by an amount sufficient to place the first imaging device of the array adjacent the next scan line.

The four vertical lines in each fragment represent streaked printing artifacts caused by any of the flaws described above. Because the streaks recur at intervals equal to the width of the writing heads, one can infer that a single flaw is associated with each head. Specifically, the illustrated positions of the streaks suggest that, in each case, the lead imaging device is responsible.

During printing, the four image fragments 120a, 120b, 120c and 120d are sequentially impressed onto the same physical location of the recording medium; in other words, they are printed in register. The final composite image, representing these fragments overlaid one on another, is indicated by reference numeral 124. Because they are printed in register, the four vertical artifacts reinforce one another, as shown by the heavy vertical lines.

Figure 11B:
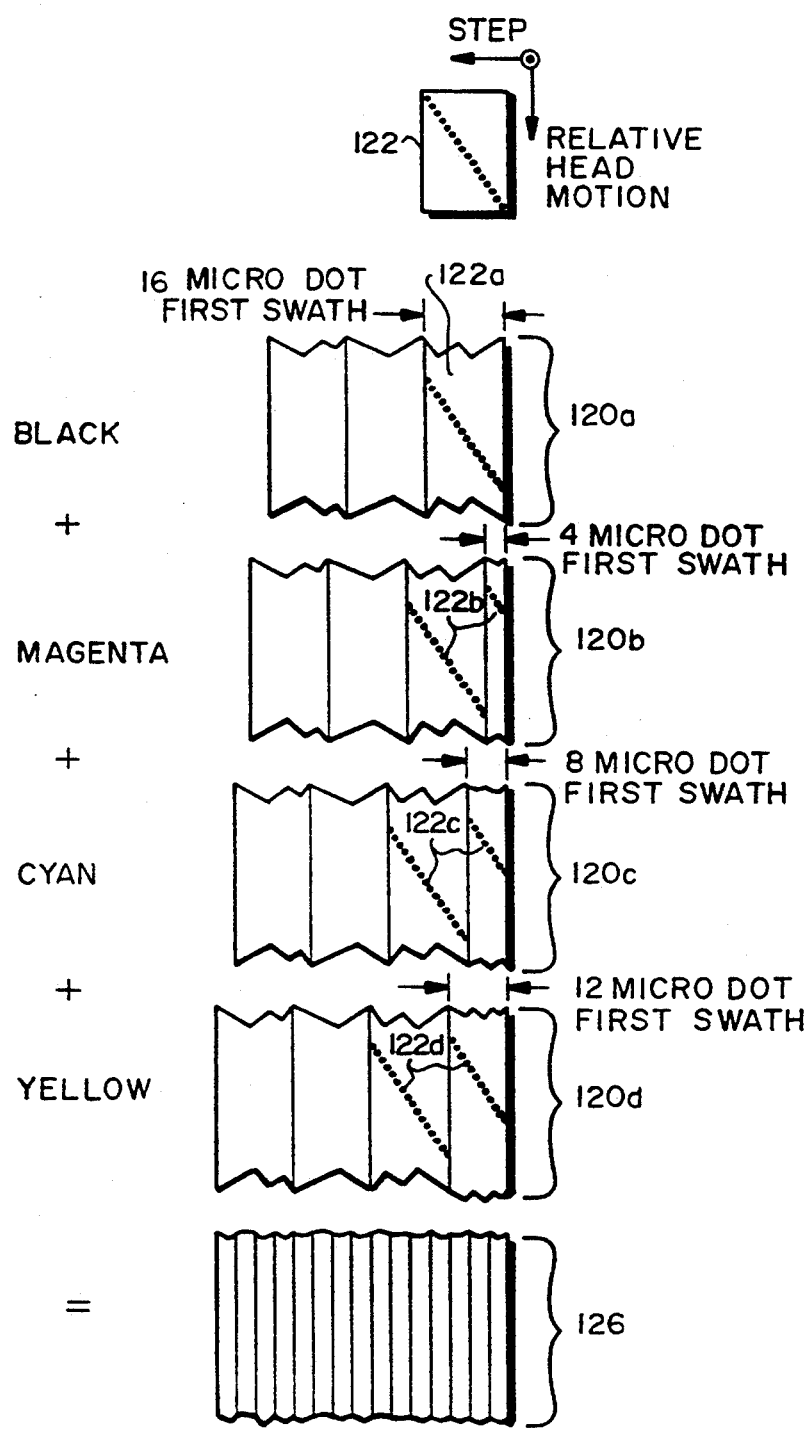
FIG. 11B is a schematic representation of our approach toward minimizing the visual impact of the artifact shown in FIG. 11A.

Our solution to this problem is shown in FIG. 11B. Essentially, it involves staggering the initial imaging positions of the writing heads, so that artifacts caused by similarly situated elements within the heads do not appear at the same positions on the plates, and also appear less visually prominent due to their proximity to one another. Thus, in FIG. 11B, writing head 122a (corresponding to black) begins imaging at the same initial position as was the case in FIG. 11A. However, writing, head 122b, (corresponding to magenta) is positioned only partially over the imaging area at different lateral positions such that during the initial imaging pass, only the last four (of sixteen) imaging devices actually cover and produce discharges on the image area. After the first longitudinal pass, writing head 122b is advanced laterally by the usual stepping amount, and all 16 imaging devices are active (as shown by the succeeding set of circles); however, since the first pass was staggered, the position of each successive magenta vertical artifact is advanced by one-fourth the width of the writing heads. Similarly, only the last eight imaging devices of writing head 122c (corresponding to cyan) produce discharges during the first imaging pass, thereby advancing the position of each successive cyan artifact by one-half the width of the writing heads, and only the last twelve imaging devices of writing head 122d (corresponding to yellow) produce discharges during the first imaging pass, thereby advancing the position of each successive yellow artifact by three-fourths the width of the writing heads. During successive scans, all of the imaging devices are selectively activated as discussed hereinabove to produce image swaths. (The stagger amounts associated with each color are given for illustrative purposes only; there is no advantage to associating a particular stagger amount with a specific color.)

The final composite image is indicated by reference numeral 126, and shows how the vertical artifacts are closely and evenly spaced from one another. The same effect can be obtained, for example, by selecting a different imaging device in each array as the first device, thereby reducing the number of imaging devices that write during the first pass, and producing truncated longitudinal swaths of differing lateral widths. After this first pass, each head is stepped lateral by a corresponding smaller amount, so that at the second pass, the heads are positioned to produce full swaths at staggered lateral plate positions.

In one embodiment, the imaging devices of each writing head are non-contact electrodes axially spaced 0.001 inch apart (as shown in FIG. 2B); the total width of each head, then, is 0.016 inch. Without staggering, the artifacts shown in FIG. 11A will occur each 0.016 inch, corresponding to a frequency of 62.5 artifacts per inch. This frequency is small enough to be perceived by the human eye. Using the technique described above, the artifacts occur each 0.004 inch, or at a frequency of 250 artifacts per inch; under ordinary lighting and viewing conditions, the human eye cannot resolve such closely spaced features.

By evenly staggering the writing heads, the distance between artifacts can be reduced to a length equal to the width of each writing head divided by the total number of heads. It should also be noted that this technique can be applied to imaging systems having any number of independent heads and imaging devices within each head.

In the above example, we stipulated that the streak artifacts were caused by malfunction of the lead imaging device in each head. In fact, we have observed just such a phenomenon on a variety of plate constructions using the writing head shown in FIGS. 2A and 2B. The first electrode to image the printing surface after stepping tends to ablate plate-surface material less strongly than the succeeding electrodes in the array; this is found to be so regardless of which electrode is selected to image first. We are uncertain as to the precise cause of this behavior, although we believe that it may be due to debris from the previous imaging pass acting as an insulator, or to field effects due to the shape and electrical capacity of the plate metal at edges created by the previous imaging pass, or to a combination of both of these effects.

The staggering technique described above can be used to minimize the visual impact of this phenomenon; alternatively, the drive circuitry can be modified to apply greater voltage and/or current to the lead electrode in order to compensate for the deficiency in ablation.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A method of reducing printing artifacts in a printing apparatus including a plurality of printing plates, each of which is produced by successive scans of an array of imaging devices, the printing artifacts caused by defective operation of one or more of the imaging devices, the method comprising the steps of:

for each array, selecting a different number of imaging devices of the array to image an initial swath longitudinally along the associated printing plate;

positioning each array opposite the associated printing plate at differing lateral positions so that each swath begins at an identical longitudinal plate location;

imaging an initial swath on each plate by moving each printing plate relative to the associated array and selectively activating the selected imaging devices;

imaging subsequent swaths by advancing each array laterally along the associated printing plate and selectively activating all of the imaging devices of each array, thereby maintaining the differential position of each array relative to the other arrays and the respective associated plates that was established by the selection of different numbers of imaging devices for the initial swath; and successively printing with each of the plates in registration with one another to produce a composite image.

2. A method of reducing printing artifacts in a printing apparatus including a plurality of printing plates, each of which is produced by successive scans of an array of imaging devices, the printing artifacts caused by defective operation of one or more of the imaging devices, the method comprising the steps of:

for each array, selecting a different number of imaging devices to image an initial swath longitudinally along the printing plate;

positioning the arrays opposite the associated printing plate at identical longitudinal plate locations;

imaging an initial swath on each plate by moving each printing plate relative to the associated array and selectively activating the selected imaging devices;

advancing the arrays laterally along the plates to positions just beyond the respective initial swaths;

imaging subsequent swaths by successively moving each printing plate relative to the associated array, selectively activating all of the imaging devices of each array during this movement and then advancing the array laterally along the plate in steps between successive swaths, thereby maintaining the differential position of each array relative to the other arrays and the respective associated plates that was established by the selection of different numbers of imaging devices for the initial swath; and successively printing with each of the plates in registration with one another to produce a composite image.

* * * * *